Oct. 4, 1960   E. J. CAVANAUGH   2,954,836
SELF CLEANING FRICTION DRIVE FOR LAWN MOWERS
Filed June 9, 1958
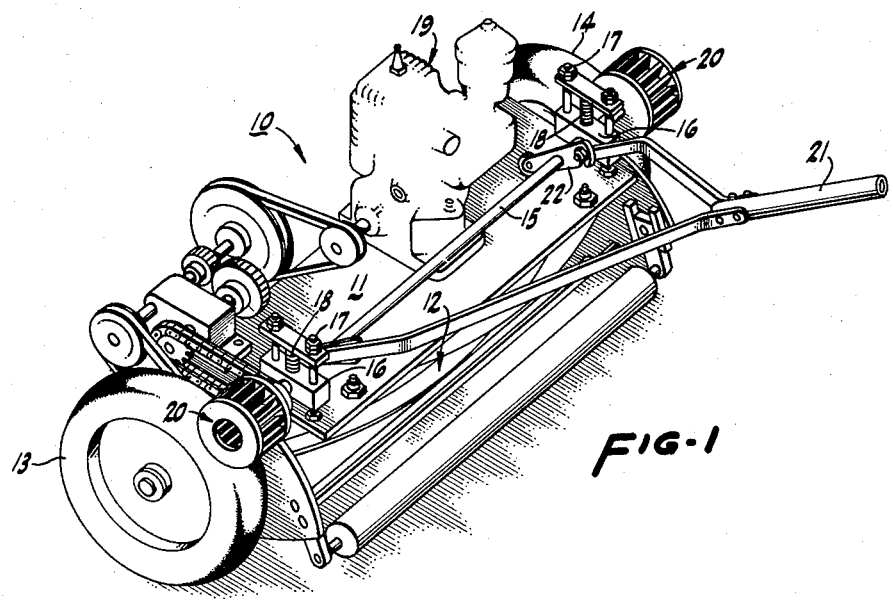
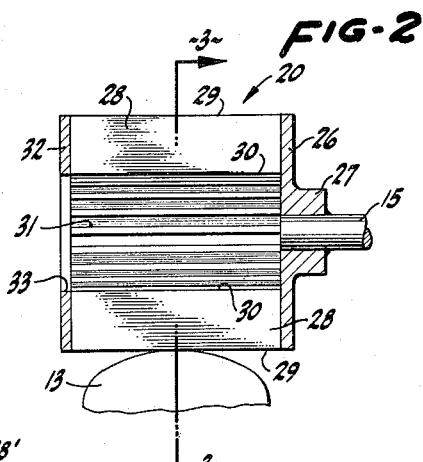
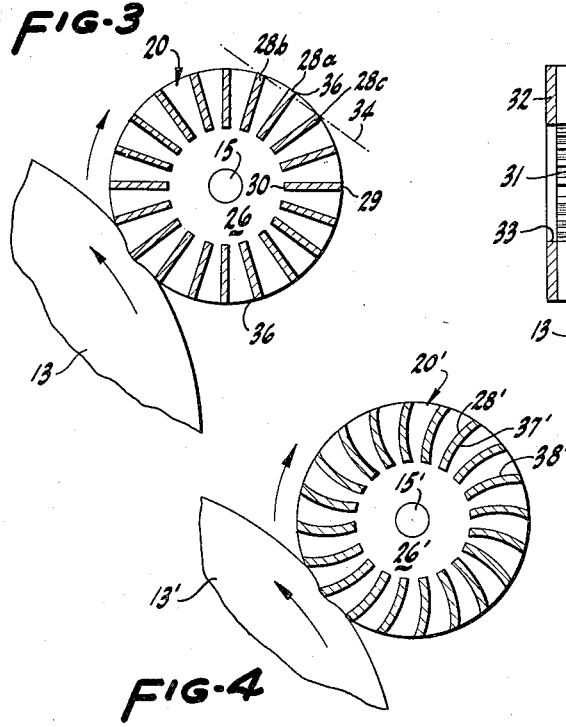
INVENTOR.
EDWIN J. CAVANAUGH
BY
Mellin and Hanscom
ATTORNEYS United States Patent Office 2,954,836
Patented Oct. 4, 1960

2,954,836

SELF CLEANING FRICTION DRIVE FOR LAWN MOWERS

Edwin J. Cavanaugh, 5754 Verna Way, Concord, Calif.

Filed June 9, 1958, Ser. No. 740,653

3 Claims. (Cl. 180—74)

This invention relates to lawn mowers and more particularly to an improved self cleaning friction drive therefor.

This invention relates more specifically to lawn mowers of the general type disclosed in my co-pending application entitled "Power Drive for Lawn Mowers," Serial No. 667,649, filed June 24, 1957, and now Patent No. 2,852,083, wherein the ground engaging wheels are frictionally driven by power driven friction rollers. Difficulties have been experienced in such lawn mowers because of excessive slippage between the friction rollers and wheels due largely to the wetting of the wheels by contact with the grass in normal usage. As the wheels become wet the effectiveness of the friction drive is reduced, and, in addition, the wetness of the wheels causes cut grass to adhere thereto, which decreases the frictional engagement even more. Attempts have been made to overcome this by roughening, knurling or grooving the friction rollers to increase the gripping of the wheel thereby, which has been partially successful on wet wheels, except that the frictional surface of the rollers soon becomes clogged with the cut blade of grass carried by the wheels. The friction rollers must then be cleaned to remove the clogging grass blades in order to restore the friction drive to full effectiveness.

I have overcome these difficulties by providing a self cleaning friction roller for use on a lawn mower, which is not susceptible to clogging by grass blades and which is fully effective on wet lawn mower wheels. This I have done by providing a friction roller having closely spaced apart fins engageable with the periphery of a rubber covered lawn mower wheel in which the fins permit the relatively free passage of grass blades therebetween so that such blades cannot clog the roller fins.

It is an object of the invention to provide a friction roller comprising a circular end plate adapted to rotate in one direction, and a plurality of fins each mounted at one end thereof generally radially on one face of said plate, and projecting away therefrom, said fins being spaced apart from one another around said plate and having their outer surfaces spaced an equal distance from the center of rotation of said plate, said fins having their inner surfaces spaced from one another and from the center of rotation thereof to form a grass-receiving chamber.

A further object of the invention is to provide a power driven lawn mower comprising a frame, a rubber covered ground engaging wheel rotatably mounted on said frame, a drive shaft journalled on said frame, power means for rotating said drive shaft in one direction, a friction roller mounted on said shaft, said roller comprising a first circular end plate fixed to said shaft for rotation therewith, a plurality of fins each mounted at one end thereof generally radially on one face of said first plate and projecting away therefrom, said fins being spaced apart from one another around said first plate and having their outer surfaces spaced an equal distance from the center of rotation of said first plate, said outer surfaces of said fins being normal to a radius line passing through said outer surfaces, said fins having their inner surfaces spaced from one another and from the center of rotation thereof to form a grass-receiving chamber, a second circular end plate parallel to said first plate and connected to the other ends of said fins, an opening through said second plate into said chamber to permit grass to pass outwardly from said chamber through said second plate, said roller being adapted to be tangentially pressed against said wheel with the outer fin surfaces thereof engaging the resilient periphery of said wheel, and means for pressing said roller against said wheel.

Other objects and advantages will become apparent in the course of the following detailed description.

In the drawings, forming a part of this application, and in which like parts are designated by like reference numerals throughout the same, Fig. 1 is a perspective view of a lawn mower embodying the concept of the invention.

Fig. 2 is a sectional view of the friction roller and ground engaging wheel with parts shown generally in elevation.

Fig. 3 is a sectional view taken on line 3—3 of Fig. 2.

Fig. 4 is a sectional view similar to Fig. 3, illustrating a modification of the friction roller.

Referring now to the drawings, the lawn mower 10 comprises a frame 11 having a cutting reel 12 mounted therein and having rubber covered ground engaging wheels 13 and 14 mounted at each end thereof. A drive shaft 15 is journalled in bearing blocks 16 adjacent each end thereof, which are mounted for vertical movement on bolts 17 and are biased downwardly by springs 18. A gasoline engine 19, mounted on frame 11, provides the motive force for driving the drive shaft in a clockwise direction (as viewed in Fig. 1). A friction roller 20 is fixed to each end of the drive shaft and the rollers are normally held in tangential engagement with the resilient peripheries of the wheels 13 and 14 by the springs 18 to transmit the rotation of the drive shaft to the wheels to propel the lawn mower forwardly. A manually operable handle 21 is carried by the drive shaft and can be operated to move the friction rollers out of engagement with the wheels by means of the cam levers 22 on the end of the handle, as fully described in my above referred to application.

Referring now to Figs. 2 and 3, the friction roller 20 comprises a circular end plate 26 having a hub 27 on one face thereof for attachment to the drive shaft 15. A plurality of fins 28 are mounted at one end thereof on the other face of plate 26, with each fin being disposed generally radially of the end plate and projecting away therefrom. The fins 28 are spaced apart from one another around the plate and have their outer surfaces 29 spaced an equal distance from the center of rotation of the roller. The outer surfaces 29 of the fins are preferably flat and normal to a radius line passing through the outer surface of the fin so that the fins will have a good biting engagement with the periphery of the wheels 13 and 14.

The fins 28 extend inwardly of the roller and have their inner surfaces 30 spaced from one another and from the central axis of the roller so as to form a grass-receiving chamber 31.

A second end plate 32 is connected to the other ends of fins 28 and is provided with a central opening 33 therethrough to permit grass within the control chamber 30 to fall freely therefrom.

As will be seen in Fig. 3 fin 28a projects outwardly beyond an imaginary line 34 drawn touching the outermost part of the adjacent fins 28b and 28c on either side thereof, thus enabling the leading edge 36 of the fin to bite slightly into the resilient covering of wheel 13 to obtain a good gripping engagement therewith even though the surface of the wheel is wet.

Thus, in operation, rotation of the friction rollers by drive shaft 15 causes the leading edge 36 of the fins to bite slightly into the resilient periphery of the wheels 13 and 14 to propel the lawn mower 10 forwardly with a minimum of slippage between the friction roller and the wheels. Such slippage will be minimized even though the wheels become dampened or wet by their contact with the grass. Normally, any grass that clings to the surface of the wheels would normally tend to clog the friction roller fins, but, by the construction of the rollers, this grass passes relatively freely between the fins into the central chamber 31 and spills out through the opening 33 in end plate 32 back onto the ground. In the event that the chamber 31 does become clogged with grass, it is a simple procedure to insert a finger, stick or the like to remove the clogged grass after stopping the rotation of roller 20.

Fig. 4 illustrates a modification 20' of the friction roller, which differs from the roller 20 by the shape of the fins 28'. In this instance, the fins are curved about their longitudinal axes with the leading surfaces 37' thereof being concave in shape and the trailing surfaces 38' thereof being convex in shape. As will be apparent, this construction greatly increases the strength of the fins so as to resist bending thereof by their contact with the wheels 13 and 14. In all other respects the construction and operation of this modification is the same as that previously discussed.

It is to be realized that the modifications of this invention herewith shown and described are to be taken as preferred embodiments of the same and that various changes in the shape, size and arrangement of parts may be resorted to without departing from the spirit of the invention or the scope of the attached claims.

Having thus described my invention, what I claim and desire to secure by Letters Patent is:

1. In combination with a power driven lawn mower having a frame, a rubber covered ground engaging wheel rotatably mounted on said frame, and a drive means therefor comprising a drive shaft journaled on said frame, power means for rotating said drive shaft in one direction, a friction roller mounted on said shaft, said roller comprising a circular end plate fixed to said shaft for rotation therewith, a plurality of vane members each mounted at one end thereof generally radially on one face of said end plate and projecting away therefrom, said vane members being spaced apart from one another around said end plate and having their outer peripheral edges spaced an equal distance from the center of rotation of said end plate, said vanes having their inner edges spaced from one another and from the center of rotation thereof, said inner edges defining a central grass-receiving chamber in open communication with passages formed between said vanes, said roller being adapted to be tangentially pressed against said wheel with the outer peripheral edges thereof engaging the resilient periphery of said wheel, and means for pressing said roller against said wheel.

2. A lawn mower as set forth in claim 1 wherein said friction roller vanes are curved about their longitudinal axes with leading vane surfaces being concave and trailing vane surfaces being convex.

3. In combination with a power driven lawn mower having a frame, a rubber covered ground engaging wheel rotatably mounted on said frame, and a drive means therefor comprising a drive shaft journaled on said frame, power means for rotating said drive shaft in one direction, a friction roller mounted on said shaft, said roller comprising a first circular end plate fixed to said shaft for rotation therewith, a plurality of vane members each mounted at one end thereof generally radially on one face of said first plate and projecting away therefrom, said vane members being spaced apart from one another around said first plate and having their outer peripheral edges spaced an equal distance from the center of rotation of said first plate, said outer edges of said vanes being normal to a radius line passing through said outer edges, said vane members having their inner edges spaced from one another and from the center of rotation thereof, said inner edges defining a central grass-receiving chamber in open communication with passages formed between said vanes, a second circular end plate parallel to said first plate and connected to the other ends of said vane member, an opening through said second plate into said chamber to permit grass to pass outwardly from said chamber through said second plate, said roller being adapted to be tangentially pressed against said wheel with the outer peripheral edges thereof engaging the resilient periphery of said wheel, and means for pressing said roller against said wheel.

References Cited in the file of this patent

UNITED STATES PATENTS

| | | |
|---|---|---|
| 931,982 | Anderson | Aug. 24, 1909 |
| 1,200,347 | Hawes | Oct. 3, 1916 |
| 1,517,338 | Bessiere | Dec. 2, 1924 |
| 1,939,325 | Teter | Dec. 12, 1933 |
| 2,203,463 | Gerber | June 4, 1940 |
| 2,236,027 | Bowen et al. | Mar. 25, 1941 |
| 2,647,619 | Green | Aug. 4, 1953 |
| 2,691,421 | Swanson | Oct. 12, 1954 |

FOREIGN PATENTS

| | | |
|---|---|---|
| 647,943 | Germany | July 16, 1937 |
| 428,904 | Italy | Jan. 8, 1948 |